(12) United States Patent
Becker et al.

(10) Patent No.: US 9,393,880 B2
(45) Date of Patent: Jul. 19, 2016

(54) METHOD FOR DATA TRANSFER BETWEEN ELECTRONIC CONTROL DEVICES, BATTERY AND MOTOR VEHICLE WITH SUCH A BATTERY

(71) Applicants: Robert Bosch GmbH, Stuttgart (DE); Samsung SDI Co., Ltd., Yongin-si, Gyeonggi-do (KR)

(72) Inventors: Jens Becker, Ludwigshafen am Rhein (DE); Christoph Brochhaus, Aachen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/410,773

(22) PCT Filed: Jun. 18, 2013

(86) PCT No.: PCT/EP2013/062560
§ 371 (c)(1),
(2) Date: Dec. 23, 2014

(87) PCT Pub. No.: WO2014/001135
PCT Pub. Date: Jan. 3, 2014

(65) Prior Publication Data
US 2015/0191096 A1 Jul. 9, 2015

(30) Foreign Application Priority Data
Jun. 28, 2012 (DE) .......................... 10 2012 211 125

(51) Int. Cl.
*B60L 11/18* (2006.01)
*G05B 15/02* (2006.01)
(Continued)

(52) U.S. Cl.
CPC ............ *B60L 11/1851* (2013.01); *G05B 15/02* (2013.01); *H02J 13/0086* (2013.01);
(Continued)

(58) Field of Classification Search
CPC . B60L 11/1851; G05B 15/02; H02J 13/0086; H04L 12/40169

USPC .......................................................... 701/22
See application file for complete search history.

(56) References Cited

U.S. PATENT DOCUMENTS 7,576,518 B2 * 8/2009 Sanders et al. ................. 320/150
2002/0145537 A1 * 10/2002 Mueller et al. ........... 340/870.02
(Continued)

FOREIGN PATENT DOCUMENTS

DE 10 2004 046 621 A1 4/2005
WO 02/21662 A2 3/2002
WO 2010/058013 A2 5/2010

OTHER PUBLICATIONS

International Search Report corresponding to PCT Application No. PCT/EP2013/062560, mailed Oct. 1, 2013 (German and English language document) (7 pages).

*Primary Examiner* — Mussa A Shaawat
*Assistant Examiner* — Yazan A Soofi
(74) *Attorney, Agent, or Firm* — Maginot, Moore & Beck LLP

(57) ABSTRACT

The disclosure relates to a method for data transfer between electronic control devices, a battery and a motor vehicle with such a battery, which are particularly suitable for reducing the communications load on the communications bus between a main control device and one or more subordinate control devices, particularly between control devices of a battery management system. For this purpose, a method for data transfer between electronic control devices is provided, wherein the control devices comprise at least one main control device and at least one subordinate control device. Measurement values are detected by the at least one subordinate control device. Derived data is formed by the at least one subordinate control device from at least one part of the detected measurement values, and the derived data is transferred to at least one main control device.

8 Claims, 3 Drawing Sheets

(51) Int. Cl.
*H02J 13/00* (2006.01)
*H04L 12/40* (2006.01)
*H01M 10/42* (2006.01)

(52) U.S. Cl.
CPC . *H04L12/40169* (2013.01); *H01M 2010/4271* (2013.01); *H01M 2010/4278* (2013.01); *H01M 2220/20* (2013.01); *H04L 2012/40273* (2013.01)

(56) References Cited

U.S. PATENT DOCUMENTS

| 2008/0135316 | A1* | 6/2008 | Koch | B60L 11/1851 324/427 |
| 2013/0234672 | A1* | 9/2013 | Kubota | H02J 7/0016 320/134 |
| 2013/0266831 | A1* | 10/2013 | Motohashi | H01M 4/131 429/61 |

* cited by examiner

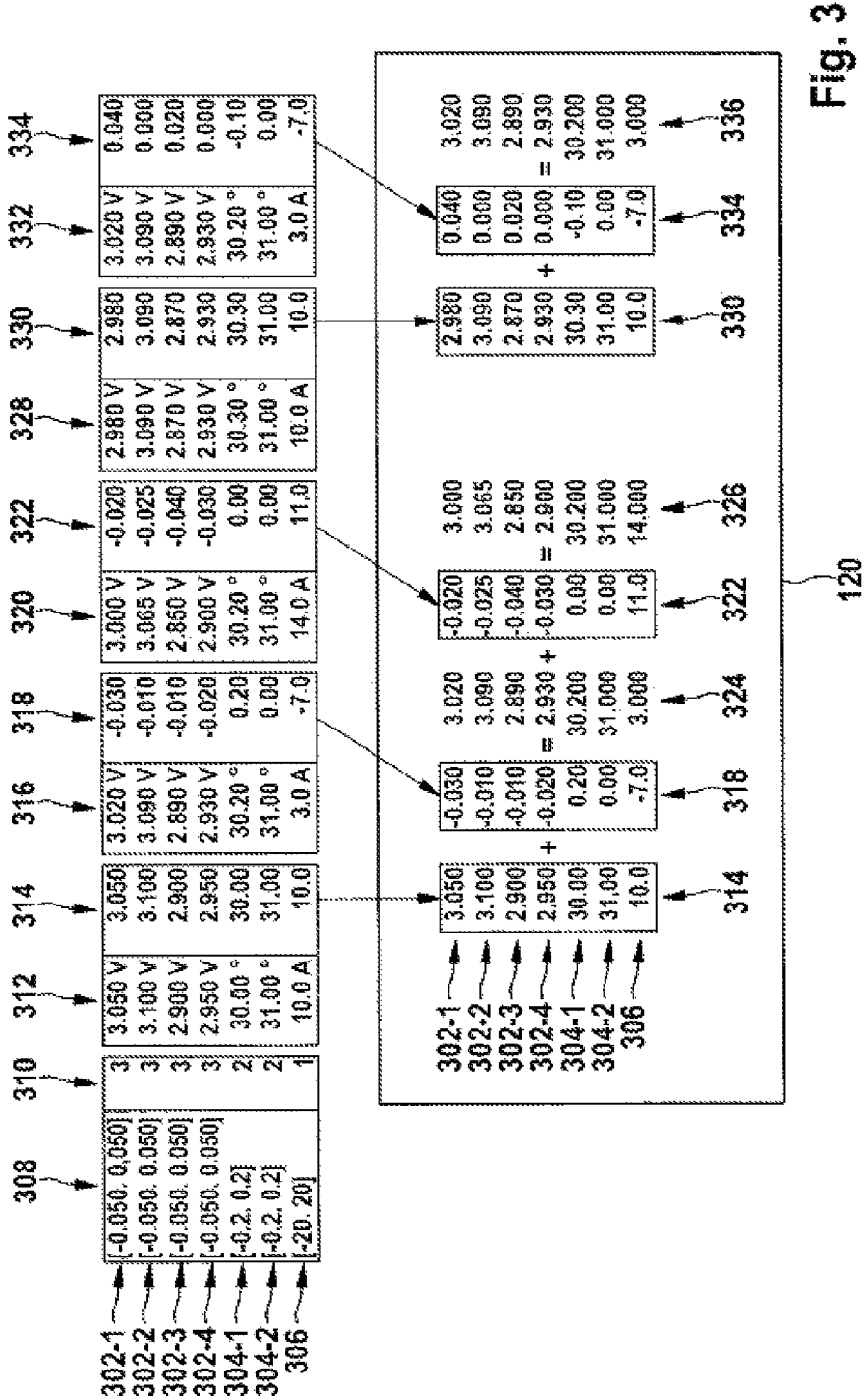

...

METHOD FOR DATA TRANSFER BETWEEN ELECTRONIC CONTROL DEVICES, BATTERY AND MOTOR VEHICLE WITH SUCH A BATTERY

This application is a 35 U.S.C. §371 National Stage Application of PCT/EP2013/062560, filed on Jun. 18, 2013, which claims the benefit of priority to Ser. No. DE 10 2012 211 125.5, filed on Jun. 28, 2012 in Germany, the disclosures of which are incorporated herein by reference in their entirety.

The disclosure relates to a method for data transmission between electronic controllers, a battery and a motor vehicle having such a battery, which can be used, in particular, to reduce the communication load on the communication bus between a main controller and one or more subordinate controllers, in particular between controllers of a battery management system.

BACKGROUND

Electronic controllers are used in increasing numbers in the automotive field (for example motor controllers, anti-lock brake systems, airbags, etc.). The development of battery packs with an associated battery management system (BMS) is necessary for electrically driven vehicles. A BMS comprises controllers with software for monitoring the battery functionality. Depending on the customer's requirements or available installation spaces, the topologies of battery packs are very varied in relation to the number of cells, modules, sensors, etc.

Typical BMSs ensure the safe and reliable function of the cells and packs. They monitor and control currents, voltages, temperatures, insulating resistance and other variables for the cells and the battery pack as a whole. Using said variables, management functions can be realized which increase the service life, the reliability and the safety of the battery system.

A BMS consists of a multiplicity of controllers on which individual software functionalities run. Depending on the number of cells, the number of sensors and the distribution of the battery modules in different installation spaces in the vehicle, a controller topology emerges which has a main controller and a plurality of subordinate sensor controllers for acquiring the measured data directly at the individual battery modules. The measured data can be, for example, voltages, temperatures, currents, etc. The acquired data is exchanged between the controllers via a communication bus, for example a controller area network (CAN).

By using a communication bus with a defined bandwidth, the total data traffic which can be transported on the bus in a particular time is limited. A narrow maximum bandwidth reduces the probability of disturbances, for example by undesired electrical or electromagnetic effects. By using a high number of battery modules and associated sensor controllers, all measured data must be very frequently communicated on the bus to the main controller. The measurement frequency is thus limited by the bandwidth on the bus and the number of battery modules.

A method and a device for processing signals from battery sensors is known from published application DE 10 2004 046 621 A1, wherein, for two measured variables, in particular for current and voltage, a sliding average is formed in each case from two successive measured values of a measured variable, wherein the Nth and the N+1th value of the first measured variable is weighted with different factors from the Nth and N+1th value of the second measured variable.

SUMMARY

A particular advantage of the disclosure consists in that the number of electronic controllers which communicate with one another via a communication bus can be increased in comparison with the conventional solutions for the same bandwidth of the communication bus. This is achieved in that, in the case of the method according to the disclosure for data transmission, at least one main electronic controller and at least one subordinate electronic controller communicate with one another via a communication bus for data transmission. Preferably, a multiplicity of subordinate electronic controllers communicates with one main electronic controller.

In a preferred embodiment, provision is made for the at least one main electronic controller and the at least one subordinate electronic controller to be components of a BMS. The at least one subordinate electronic controller comprises at least one sensor which detects predefined measured variables, for instance current, voltage, temperature or the like. The measured values are acquired and processed, for instance digitized, by the subordinate controller(s).

According to the disclosure, the processing comprises determining data derived from the acquired measured values. The derived data is transmitted, preferably instead of the acquired measured values, to the at least one main controller.

In a preferred embodiment, provision is made for the derived data to be the difference between measured values from successive measurements of a measured variable. Preferably, the difference is formed from two directly successive measurements. The acquired measured values are reconstructed from the derived data by the main controller using a known reference value. Since the derived data has a smaller volume than the complete acquired measured values, by transmitting the derived data bandwidth becomes free on the communication bus and can be used for additional communication.

The bandwidth occupied by the derived data can be controlled according to a preferred embodiment by a resolution being predefined for the derived data. Preferably, the resolution is predefined on the basis of the acquired measured variable, with the result that, for example, a greater resolution is predefined for rapidly changing measured variables, for instance current, than for measured variables which change only slowly, for instance the temperature of battery cells. A lower resolution can be predefined for these. In a preferred embodiment, provision is made for the necessary bandwidth for transmitting the derived data to be controlled by corresponding predefinition of the resolution of the derived data and/or the frequency of transmission of the acquired measured values to be predefined. Owing to the control, provision can be made, for example, for the bandwidth of the communication bus to not be completely used by the transmission of the measured values or derived data, with the result that unused bandwidth (buffer) is made available. It proves to be advantageous if the buffer is used to transmit other data. The buffer can be used, for example, to transmit data from the main controller to the subordinate controllers, for example to transmit service requests or check messages.

Another preferred embodiment provides that a measured value acquired in a previous measurement is used as reference value. It proves to be advantageous if at least some of the subordinate controllers transmit a measured value acquired in a measurement according to a predefinable number of derived data items. Thus, in each case the complete measured values acquired in the subsequent measurements can be reconstructed from the measured value acquired in the measurement and from the derived data which is compiled in the subsequent measurements. It proves to be advantageous in this case if some of the subordinate controllers transmit derived data and the other subordinate controllers transmit acquired measured values completely to the main controller.

As a result, even loading of the bandwidth can be achieved. The subordinate controllers preferably send the derived data and/or acquired measured values cyclically.

Another aspect of the disclosure relates to a battery which is combined with at least one main controller and at least one subordinate controller, wherein the at least one main controller and the at least one subordinate controller are set up such that a method for data transmission can be performed, wherein measured values are acquired by the at least one subordinate controller, data derived from at least some of the acquired measured values is compiled by the at least one subordinate controller and the derived data is transmitted to at least one main controller. The battery is preferably a lithium-ion battery or the battery preferably comprises electrochemical cells which are designed as lithium-ion battery cells.

Another aspect of the disclosure relates to a motor vehicle having an electric drive motor for driving the motor vehicle and a battery which is connected or connectable to the electric drive motor according to the aspect of the disclosure described in the preceding paragraph. However, the battery is not restricted to such a use purpose; rather it can also be used in other electrical systems.

By matching the data transmission (only the difference values are transmitted), the maximum number of sensor controllers is increased for the same bandwidth of the data bus, and more battery modules can communicate in a disturbance-free manner on the data bus. In the case of the suggested method, the measurement accuracy is preserved in contrast to the unchanged transmission of all measured data.

The disclosure has the following advantages:
- The used bandwidth is reduced, with the result that the data bus is used only to a lesser extent and is thus less prone to disturbance.
- Space is provided for an additional communication (service) since, owing to the lower usage of the bus, an additional communication can be added onto the bus, for example a service request from the main controller to the sensor controllers.
- A plurality of sensors can communicate via the bus since, owing to the lower bus load, additional controllers can communicate on the bus. Thus, the total number of sensor controllers can be increased for the same bandwidth.
- There is no loss of accuracy since the complete data sets are periodically transmitted. Thus, the measured data can be calculated from the difference values at any time without loss of accuracy.
- The method according to the disclosure is robust in respect of a failure and/or disturbances. Since complete data can also be periodically transmitted, the failure of and/or disturbance to the transmission of difference data can be compensated.
- The bandwidth of the transmitted data or the reduction in the required bandwidth can be easily controlled
  - by the resolution of the difference data being determined, preferably on the basis of the nature of the acquired values and/or
  - by the frequency of the transmission of the complete measured values being defined.
- A lower vulnerability to disturbance is achieved by a possible redundancy. Bus capacity which becomes free can be used for redundant transmission of measured data in order thus to reduce the vulnerability to disturbance.

Advantageous developments of the disclosure are specified in the dependent claims and described in the description.

BRIEF DESCRIPTION OF THE DRAWINGS

Exemplary embodiments of the disclosure are explained in more detail with reference to the drawings and the following description. In the drawings:

FIG. 3 shows the illustration of an exemplary reconstruction of complete measured values from derived data (in this instance: differences).

DETAILED DESCRIPTION

The disclosure will be explained in more detail below using the example of electronic controllers of a BMS. In this case, it should be noted that the disclosure is not restricted to data transmission between the electronic controllers of a BMS but comprises all embodiments which only the features of the independent claims realize.

Figure 1:
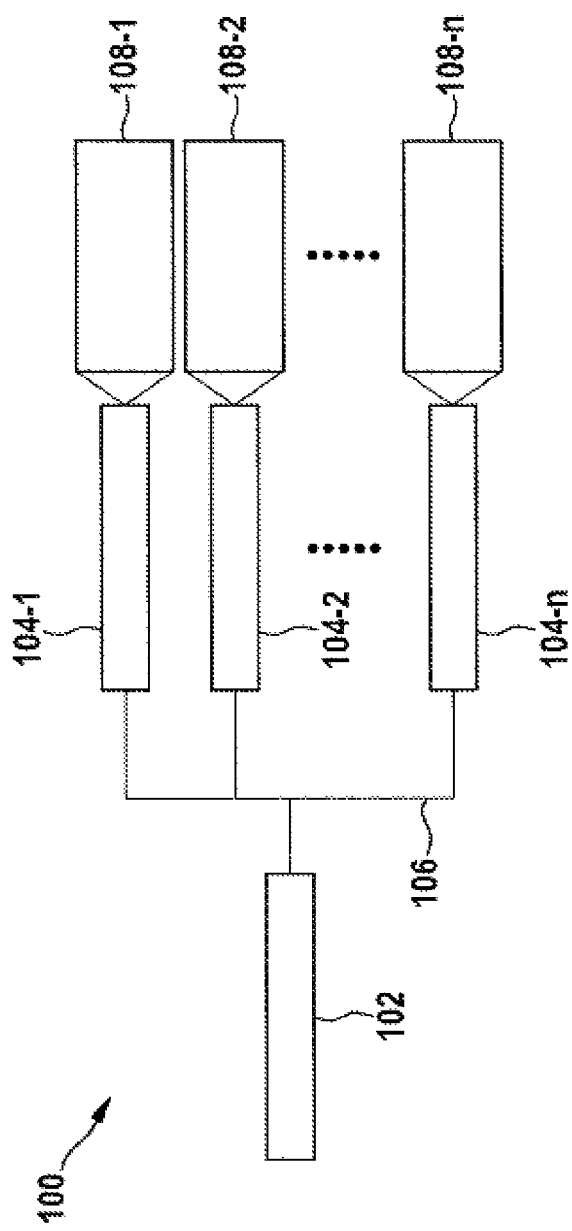
FIG. 1 shows a basic illustration of the arrangement of controllers in a BMS.

FIG. 1 shows the basic design of a BMS 100. The exemplary BMS 100 comprises a main controller 102 and a plurality of subordinate sensor controllers 104-1, 104-2, ..., 104-n. The subordinate sensor controllers 104-1, 104-2, ..., 104-n are connected to the main controller 102 via a communication bus 106. The subordinate sensor controllers 104-1, 104-2, ..., 104-n comprise sensors (not shown) which detect measured variables from battery modules 108-1, 108-2, ..., 108-n to monitor the state of the battery.

In order to be able to better use the bandwidth of the communication bus 106, in the exemplary embodiment, data is not always transmitted at the full resolution but only as difference values of previously communicated measured values. In order to guarantee the stability of the system, the complete measured values are preferably transmitted at regular intervals. In addition, a buffer to the full bus load is left in order to be able to send, for example, check messages from the main controller 102 to the sensor controllers 104-1, 104-2, ..., 104-n.

Figure 2:
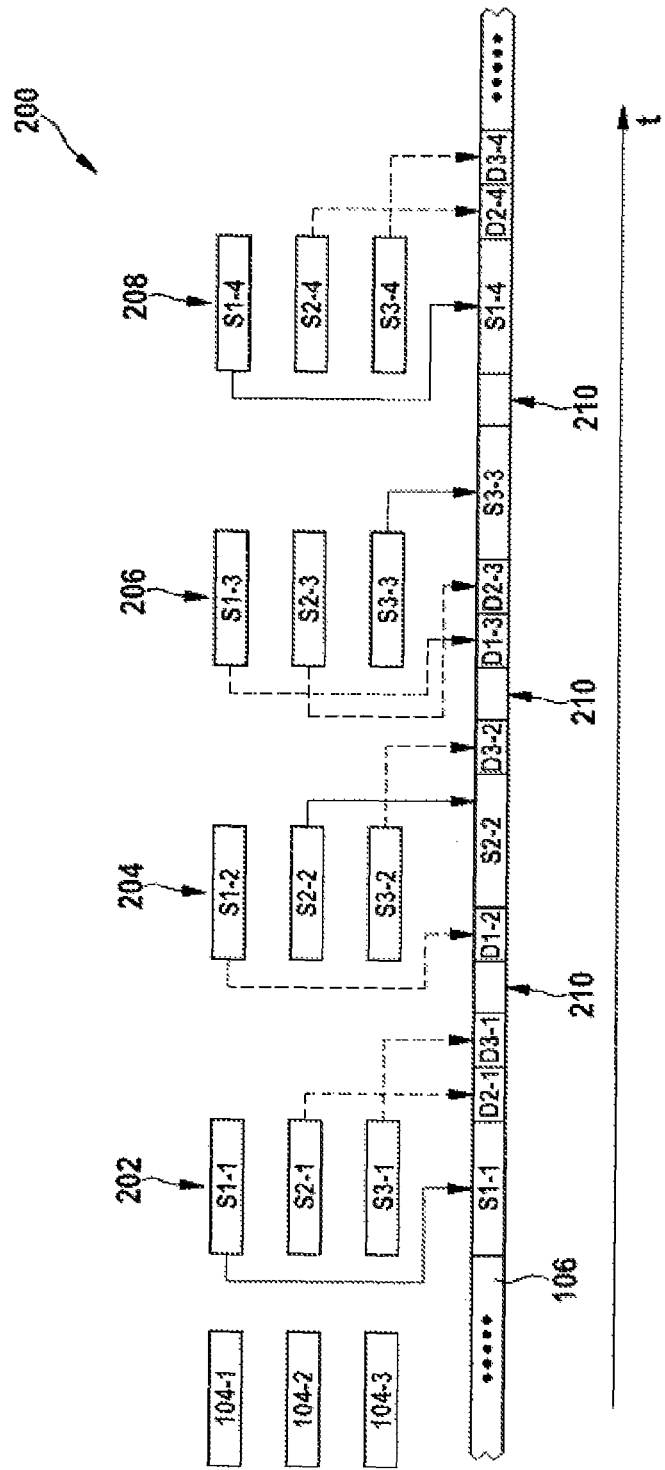
FIG. 2 shows the illustration of an exemplary measured-data communication.

FIG. 2 shows a BMS 200 with a communication bus 106. This exemplary BMS 200 comprises a main controller—not shown—and three sensor controllers 104-1, 104-2, 104-3. The sensor controllers 104-1, 104-2, 104-3 perform regular measurements and copy the measured data to the data bus 106.

In the case of the first measurement 202, measured data S1-1, S2-1 and S3-1 is determined. The first sensor controller 104-1 transmits the complete set of measured data S1-1; the other two sensor controllers 104-2 and 104-3 transmit only the difference values D2-1 and D3-1 of the last measurement 202 to the preceding measurement. The main controller receives the data set S1-1 of the first sensor controller 104-1. In addition, the complete measured data set is calculated from the previous measurement and the difference values D2-1 and D3-1 of the second and third sensor controllers 104-2 and 104-3.

In the case of the subsequent second measurement 204, measured data S1-2, S2-2 and S3-2 are again measured. The first and the third sensor controllers 104-1 and 104-3 transmit the difference values D1-2 and D3-2 to the preceding measurement 202. The second sensor controller 104-2 transmits the complete measured data set S2-2. The main controller receives the data set S1-2 of the second sensor controller 104-2. In addition, the complete measured data set is calculated from the previous measurement 202 and the difference values D1-1 and D3-1 of the first and third sensor controllers 104-1 and 104-3.

In the exemplary embodiment, in the subsequent measurements 206, 208, ..., the complete measured data set S3-3, S1-4 is always transmitted to the main controller by one of the sensor controllers 104-1, 104-2, 104-3, and the difference values D1-3, D2-3, D2-4, D3-4 from the last and the previous measurement are always transmitted to the main controller by the other two sensor controllers 104-1, 104-2, 104-3 in a cyclical fashion.

Of course, embodiments can be provided in which no complete measured data set, rather only the difference values, is transmitted for one or more successive measurements. In this case, complete measured data sets are transmitted at greater intervals. The intervals are selected such that the required accuracy of the reconstruction of the measured values from the difference values is always ensured. The intervals can therefore be selected to be different for the different measured variables. Thus, for example, the intervals in the case of the temperature measurement can be selected to be greater than, for example, in the case of the current measurement.

Embodiments can be provided in which all of the sensor controllers 104-1, 104-2, 104-3 in each case transmit complete data sets or difference values to the main controller. This would lead to less bandwidth being used up during the transmission of difference values by the data transmission from the sensor controllers 104-1, 104-2, 104-3 to the main controller whereas, in the case of cyclical transmission of the complete data sets, the bandwidth is more evenly used.

The resolution of the difference data can be selected on the basis of the nature of the measured variables.

Battery cell voltages change depending on the battery cell characteristics by only at most x volts in the time interval T. Module temperatures change significantly more slowly than cell voltages. The difference values for the temperature can therefore be transmitted with lower resolution than the difference values for the battery cell voltages. Currents change very rapidly. Difference values for current can therefore be transmitted with only slightly lower resolution than the complete values.

By appropriate selection of the resolution on the basis of the nature of the measured variables, further bandwidth on the communication bus 106 can be spared.

FIG. 3 illustrates which values are transmitted and how the complete measured values are reconstructed from the transmitted difference values using the example of the first sensor controller 104-1. Four cell voltage values 302-1, 302-2, 302-3, 302-4, two temperature values 304-1, 304-1 and a current value 306 are acquired by the sensors of the sensor controller 104-1. For each of the values, the maximum change 308 between two measurements and the respective resolution 310 are defined. In the present example, the resolution gives the number of decimal places. The values 312 acquired in the first measurement are evaluated by the sensor controller 104-1. By way of example, depending on the position of the measurement within the cycle, the complete data set is or the difference values are transmitted. In the exemplary first measurement, the complete measured values 314 are provided to the communication bus 106. The difference 318, 322 from the measured values 316, 320 determined in the second and third measurements to the measured values from the first or second measurement is compiled and the difference 318, 322 is provided to the communication bus 106.

The complete measured values are reconstructed in the main controller 102. In detail, this occurs by the differences 318 which were transmitted to the main controller 102 after the second measurement being added to the complete measured values transmitted to the main controller 102 after the first measurement. With respect to the measured values 324 of the second measurement thus reconstructed, the differences 322 which were transmitted to the main controller 102 after the third measurement are subsequently added to said measured values 324 in order to obtain the reconstructed measured values 326 of the second measurement.

It proves to be advantageous if the resolution of the difference values is selected such that a buffer 210 to the full bus load is left. Said buffer can be used to transmit additional signals, for instance for control signals from the main controller to the subordinate controllers.

In the exemplary embodiment, after every third measurement, a complete set of measured values is transmitted again to the main controller 102. Therefore, in the case of every fourth measurement, the values 330 provided on the communication bus 106 correspond to the values 328 acquired during the fourth measurement while, in the case of the fifth measurement, the difference values 334 which are compiled from the values 328, 332 acquired during the fourth and fifth measurements are again provided on the communication bus 106.

The complete measured values 336 of the fifth measurement are again reconstructed in the main controller 102 by addition of the difference values 334 and the complete measured values 330 transmitted to the main controller 102 during the fourth measurement.

If, for example, the transmission of the values 318 of the second measurement were disturbed, the measured values 316 can no longer be reconstructed. Likewise, the values 320 of the third measurement cannot be reconstructed since these are based on the reconstructed values 324 of the second measurement. Since the complete measured values are also regularly transmitted (in this case again in the fourth measurement), only the measured values up to the fourth measurement no longer need to be reproduced. From the fourth measurement, the reconstruction of the values then runs stably again.

The embodiment of the disclosure is not limited to the preferred exemplary embodiments indicated above. Instead, a number of variants are conceivable that make use of the method according to the disclosure, the device according to the disclosure, the battery according to the disclosure and the motor vehicle according to the disclosure even in the case of fundamentally different kinds of embodiments.

The invention claimed is:

1. A method for data transmission between electronic controllers including a main controller and at least one subordinate controller operably connected to the main controller, the method comprising:

acquiring a sequence of measured values with the at least one subordinate controller, the subordinate controller having sensors configured to detect the sequence of measured values;

periodically transmitting measured values of the sequence of measured values from the at least one subordinate controller to the main controller, the periodic transmission having a frequency such that less than all of the measured values the sequence of measured values are transmitted;

determining difference values for each measured value of the sequence of measured values other than the periodically transmitted measured values with the subordinate controller, each difference value being a difference between a measured value and a previous measured value; and transmitting, after transmission of each periodically transmitted measured value, only the difference values for measured values other than the periodically transmitted measured values from the at least one subordinate controller to the main controller.

2. The method as claimed in claim 1, further comprising: predefining a resolution of the difference values.

3. The method as claimed in claim 2, the predefining further comprising:
predefining the resolution on the basis of a measured variable of the measured values.

4. The method as claimed in claim 1, wherein the frequency of the period transmission of the measured values is a predefined frequency based on to a predefined number of difference values to be sent between each transmitted measured value.

5. The method as claimed in claim 1, further comprising:
controlling a necessary bandwidth for transmitting the difference values by at least one of:
predefining a resolution of the difference values; and
predefining the frequency of the periodic transmission of the measured values.

6. The method as claimed in claim 4, wherein:
the at least one subordinate controller is a plurality of subordinate controllers; and
the method further comprises:
periodically transmitting measured values of the sequence of measured values from the plurality of subordinate controllers to the main controller, the plurality of subordinated controllers transmitting measured values in a staggered manner.

7. A battery system comprising:
a battery;
a main controller; and
at least one subordinate controller operably connected to the main controller, the main controller and the at least one subordinate controller being configured to:
acquire a sequence of measured values with the at least one subordinate controller, the subordinate controller having sensors configured to detect the sequence of measured values;
periodically transmit measured values of the sequence of measured values from the at least one subordinate controller to the main controller, the periodic transmission having a frequency such that less than all of the measured values the sequence of measured values are transmitted;
determine difference values for each measured value of the sequence of measured values other than the periodically transmitted measured values, each difference value being a difference between a measured value and a previous measured value; and
transmit, after transmission of each periodically transmitted measured value, only the difference values for measured values other than the periodically transmitted measured values from the at least one subordinate controller to the main controller.

8. A motor vehicle comprising:
an electric drive motor; and
a battery system that is one of connected and connectable to the electric drive motor, the battery system comprising:
a battery;
a main controller; and
at least one subordinate controller operably connected to the main controller, the main controller and the at least one subordinate controller being configured to:
acquire a sequence of measured values with the at least one subordinate controller;
periodically transmit measured values of the sequence of measured values from the at least one subordinate controller to the main controller, the periodic transmission having a frequency such that less than all of the measured values the sequence of measured values are transmitted;
determine difference values for each measured value of the sequence of measured values other than the periodically transmitted measured values, each difference value being a difference between a measured value and a previous measured value; and
transmit, after transmission of each periodically transmitted measured value, only the difference values for measured values other than the periodically transmitted measured values from the at least one subordinate controller to the main controller.

* * * * *